United States Patent Office 2,909,509
Patented Oct. 20, 1959

2,909,509

FLUORINE-CONTAINING POLYMERS AND PREPARATION THEREOF

George H. Crawford, Jr., Rahway, and Elizabeth Shen Lo, Fords, N.J., assignors, by mesne assignments, to Minnesota Mining and Manufacturing Company, St. Paul, Minn., a corporation of Delaware No Drawing. Application August 16, 1956
Serial No. 604,302

19 Claims. (Cl. 260—87.5)

This invention relates to fluorine-containing polymers having aromatic nuclei and to a method for the preparation thereof. In one aspect the invention relates to polymers of alpha-fluoro-methyl styrenes. In another aspect this invention relates to copolymers of alpha-trifluoromethyl styrenes having a trifluoromethyl group as a substituent on the benzene ring.

It is an object of this invention to provide certain new and useful polymers containing fluorine and aromatic nuclei, said polymers having desirable chemical and physical properties.

Another object is to provide new and useful polymers of alpha-trifluoromethyl styrenes which polymers possess elastomeric properties together with good physical and chemical characteristics and which can be easily fabricated into a wide variety of useful articles of improved chemical and physical stability.

Still another object is to provide new and useful polymers of alpha-trifluoromethyl styrenes which polymers can serve as protective coatings having the aforementioned characteristics and which can be readily applied to the surfaces of a wide variety of useful articles.

Still another object of the invention is to provide a process for obtaining these polymers in good yields.

Various other objects and advantages of the present invention will become apparent to those skilled in the art from the accompanying description and disclosure.

Accordingly, these objects are accomplished by the process which comprises copolymerizing a monomer mixture containing an alpha-fluoroalkyl styrene having an additional fluoroalkyl group as a substituent on the benzene ring, and a fluorine-containing polyolefin which is preferably a fluoro-1,3-diolefin, to produce copolymers having good physical and chemical stability. These polymeric products constitute valuable macromolecules and are adaptable to a wide variety of commercial uses.

The copolymer products produced in accordance with the process of this invention are useful as dielectric or insulating materials including dielectrics which are soft and rubbery. The copolymers have satisfactory low temperature properties and very good high temperature properties. For example, wire coated with these copolymers can be bent at relatively low temperatures without cracking the insulation, and at high operating temperatures the insulation does not drip off the wire. The combination of the aromatic ring, the trifluoromethyl groups and the relatively high fluorine content contributes to the desirability of these copolymers for use at high temperature. The fluorodiene comonomers not only contribute to the fluorine content of coplymers thereby increasing the degree of thermal and chemical stability of the polymers of the alpha-trifluoromethyl styrenes, but their use also leads to the production of polymeric compositions which contain aliphatic points of unsaturation. This is important in that the copolymer can be cross-linked readily by conventional methods known to the art to enhance the maximum temperatures at which they may be used. Other characteristics of these polymers which contribute to their use as insulating materials are their low moisture absorption, non-inflammability, good electrical properties, permanence, strength, and the fact that they are capable of being formed into various shapes by conventional molding techniques such as compression, injection, and extrusion techniques at temperatures from about 200° F. to about 450° F.

The copolymers also are useful as protective coatings on metal, wood, and other hard surfaces and on fabric surfaces which surfaces require protection from moisture, strong chemicals, and sunlight. The polymers are applied to such surfaces by conventional spray, dip or brush techniques.

In general, as more fully described hereinafter, the polymers of the present invention are produced by the polymerization of monomer mixtures comprising a fluoromethyl-nuclear-substituted alpha-trifluoromethyl styrene and a fluoro-1,3-diene at temperatures between about $-80°$ C. and about 150° C. with intermediate temperature ranges being selected with reference to the specific polymerization system employed. The most useful polymeric compositions of the present invention are the copolymers produced from monomeric mixtures containing between about 3 mol percent and about 80 mol percent of the above-defined alpha-trifluoromethyl styrenes, the remaining major constituent being the fluoro-1,3-diene. When the monomer mixture contains more than about 80 mol percent of the alpha-trifluoromethyl styrenes, for example, as much as 95 mole percent of the styrene, the copolymer products are hard and brittle and their low temperature flexibility is relatively poor. The preferred copolymers of the present invention are those produced from monomer mixtures containing between about 10 and about 60 mol percent of the alpha-trifluoromethyl styrene, the remaining major constituent being the fluoro-1,3-diene comonomer. The particularly preferred copolymers are those produced from monomer mixtures containing between about 10 and about 50 mol percent of the alpha-trifluoromethyl styrene since these copolymers possess the highest degree of flexibility and high temperature stability. Generally speaking, the fluorodiene comonomer usually copolymerizes more rapidly than the alpha-trifluoromethyl styrenes and usually the aforesaid monomer mixtures containing between about 3 and about 80 mol percent of the defined sytrenes lead to the production of copolymers containing between about 2 and about 60 mol percent of the styrene; monomer mixtures containing between about 10 and about 60 mol percent of the defined styrene lead to the production of copolymers containing between about 5 and about 45 mol percent of the styrene; and monomer mixtures containing between about 10 and about 50 mol percent of the defined styrene lead to the production of polymers containing between about 5 and about 35 mol percent of the styrene, the remaining major constituent of the copolymers produced in each instance being the fluoro-1,3-diene monomer unit.

The alpha-trifluoromethyl styrenes which are copolymerized as described herein are those having at least one fluoroalkyl group having from 1 to 5 carbon atoms per group (e.g. a fluoromethyl, fluoroethyl or fluoropropyl group) bonded to a carbon atom of the benzene ring. This monomer may have from 1 to 4 such nuclear substituents and preferably has not more than 2 fluoroalkyl groups bonded to the benzene ring, the remaining groups bonded to the benzene ring preferably being hydrogen. Typical examples of such compounds which are used as described herein are as follows: 3-trifluoromethyl-alpha-trifluoromethyl styrene; 2,5-bis(trifluoromethyl)-alpha-trifluoromethyl styrene; and 3,5-bis(trifluoromethyl)- alpha-trifluoromethyl styrene and any admixture thereof.

The fluorine-containing polyolefins used as comonomers include the partially fluorinated and perfluorinated polymerizable polyolefins having from 4 to about 10 carbon atoms per molecule. Of these the partially fluorinated aliphatic conjugated dienes having not more than about 6 carbon atoms per molecule are preferred. Typical examples of suitable compounds of this type which are copolymerized in accordance with the present invention are as follows: 2-fluorobutadiene; 1,1-difluorobutadiene; 1,1,2-trifluorobutadiene; 1,1,3-trifluorobutadiene; 1,1,4,4-tetrafluorobutadiene; 1,1-difluoro-2-methyl butadiene; 1,1-difluoro - 3 - methyl butadiene; 1,1,3 - trifluoro-2-methyl butadiene and 2-trifluoromethyl butadiene. The particularly preferred fluoro-1,3-dienes to be used are those containing at least 3 fluorine atoms which preferably are positioned in the 1,1,2- or 1,1,3-positions of the diene or which are on a single carbon atom such as in 2-trifluoromethyl butadiene, since the use of such comonomers leads to the production of copolymers having the highest degree of toughness and elasticity and high temperature stability.

The copolymerization reaction of the present invention may be effected in the presence of a free radical forming promoter or an ionic type promoter. The polymerization initiators which are suitably employed comprise organic compounds containing a peroxy linkage (i.e. —O—O—); azo compounds; inorganic halides of the Friedel-Crafts type; and Ziegler type catalysts. Generally speaking, such initiators are employed in an amount between about 0.001 and about 5 parts by weight per 100 parts of total monomer employed and preferably in an amount between about 0.01 and about 1.0 part by weight. The polymerization catalyst system may be aqueous or non-aqueous and includes aqueous suspension, aqueous emulsion and the static mass, stirred mass, and solution systems. The copolymerization reaction also may be initiated or catalyzed by actinic or ultraviolet radiation without departing from the scope of this invention.

The aqueous catalyst systems comprise water and a peroxy compound as the polymerization initiator. Emulsifiers, activators, accelerators, buffers, and bases also may be included as ingredients of the aqueous systems as desired. One type of aqueous system is that in which an organic peroxide is employed and a second type is that in which an inorganic peroxy compound is used. Exemplary of such organic peroxides are cumene hydroperoxide, diisopropyl benzene hydroperoxide, triisopropyl benzene hydroperoxide, tertiary-butyl hydroperoxide, tertiary-butyl perbenzoate and methyl cyclohexane hydroperoxide. Such organic peroxides usually are employed in conjunction with an emulsifier.

The inorganic peroxy compounds employed as the initiator in aqueous polymerization systems are preferably the water soluble inorganic peroxides such as the perborates, persulfates, perphosphates, percarbonates, barium peroxide, zinc peroxide and hydrogen peroxide. Particularly effective inorganic peroxides are the water soluble salts of the peracids such as the sodium, potassium, calcium, barium and ammonium salts of the persulfuric and perphosphoric acids such as potassium persulfate and sodium perphosphate.

Activators which are often used in conjunction with the peroxy compound comprise sodium bisulfite, sodium metabisulfite, sodium thiosulfate, sodium hydrosulfate, p-toluene sulfinic acid, a reducing sugar such as dextrose and levulose and, in general, any water soluble reducing agent. Such activators are generally employed in an amount between about 0.2 and about 0.8 part by weight per 100 parts of total monomers employed.

Accelerators which may be employed in the aqueous polymerization systems comprise water soluble variable valence metal salts of sulfates, nitrates, phosphates and chlorides such as cuprous sulfate, ferrous sulfate and silver nitrate. Such activators are generally employed in an amount between about 0.01 and about 0.1 part per 100 parts of total monomers employed and preferably in an amount between about 0.05 and 0.5 part by weight. When an activator such as sodium metabisulfite, and an accelerator such as ferrous sulfate are employed, the catalyst system is referred to as a redox system. The above-mentioned organic peroxides are preferably employed in such a redox system.

The emulsifiers which are employed in the preferred aqueous emulsion polymerization systems comprise metal salts such as the potassium or sodium salt derivatives derived from saturated aliphatic acids, the optimum chain length of the acid being between about 14 and about 20 carbon atoms, and the various salt derivatives of fluorochloroalkanoic acids and fluoroalkanoic acids having between about 6 and about 20 carbon atoms per molecule. Typical examples of the derivatives of aliphatic acids which may be employed are potassium stearate and potassium oleate and mixtures thereof. The derivatives of fluoroalkanoic acids which may be used include the metal salts of perfluoro acids such as potassium perfluorooctanoate and the derivatives of the polyfluoroalkanoic acids disclosed in U.S. Patent No. 2,559,752 as being effective dispersing agents in polymerization reactions. The preferred fluorochlorocarboxylic acid derivatives which may be used as emulsifiers are those of the perfluorochloro acids obtained upon hydrolysis of trifluorochloroethylene-sulfuryl chloride telomers in fuming sulfuric acid. Such perfluorochloro acids have the successively recurring unit, —$CF_2$—$CFCl$—, and a chlorine-containing end group and an even number of carbon atoms which is preferably between about 6 and about 14 carbon atoms. Typical examples of such emulsifiers are the potassium sodium, and ammonium salts of 3,5,7,8-tetrachloroundecafluorooctanoic acid and of 3,5,6-trichloroctafluorohexoranoate. The emulsifier is generally employed in a quantity between about 0.2 and about 10 parts by weight per 100 parts of total monomer and preferably between about 0.5 and about 5.0 parts by weight are used.

Buffering agents may be used to maintain appropriate pH conditions during the polymerization reaction. Typical examples of suitable buffers are disodium hydrogen phosphate, and sodium metaborate. The buffers are generally employed in an amount between about 1.0 and 4.0 parts by weight per 100 parts water, or enough to maintain the pH of the system at a value which is preferably 7 or above.

The polymerization process of the present invention also may be effected in a non-aqueous mass or bulk polymerization system comprising an organic peroxy compound or an azo compound. The organic peroxides which may be used include the aliphatic and aromatic peroxy compounds as well as the fluorine and chlorine substituted organic peroxides. Exemplary of suitable aliphatic peroxides are diacetyl peroxide, lauroyl peroxide, tertiary-butyl peroxide, caprylyl peroxide, trichloroacetyl peroxide, perfluoropropionyl peroxide, 3-carboxy propionyl peroxide, 3,4-dibromobutyryl peroxide, trifluoroacetyl peroxide, difluoroacetyl peroxide and perfluorononanoyl peroxide. Exemplary of the suitable aromatic peroxides are benzoyl peroxide, p-nitrobenzoyl peroxide and 2,4-dichlorobenzoyl peroxide. Exemplary of the azo compounds which may be employed are alpha, alpha-azo-isobutyronitrile, alpha, alpha-azo-methylnitrile and alpha, alpha-azo-ethylnitrile.

As indicated above, Ziegler type catalysts also are suitable initiators for the copolymerization of the above-defined alpha-trifluoromethyl styrenes with the fluoro-1,3-dienes. The preferred Ziegler catalysts which may be used are the compounds of metals of group III-A (i.e. aluminum, gallium and indium) in which the metal is bonded to at least one alkyl group and in which the remaining valences of the metal are bonded to hydrogen, halogen, an alkyl group, and any combination thereof.

Typical examples of suitable Ziegler type catalysts which can be employed are as follows: beryllium hydride, triethyl aluminum, triethyl indium, triisobutyl aluminum, triethyl gallium, diethyl aluminum bromide, triethyl aluminum chloride, and the like. Such catalysts may be used as essentially the sole polymerization initiator or they may be used in combination with various derivatives preferably the halides, of metals of groups IV-B, V-B, VI-B, and VIII of the periodic system and are, for example, titanium tetrachloride, zirconium tetrachloride, and ferric chloride. The concentration of the cocatalyst such as titanium tetrachloride with respect to the Ziegler catalyst such as diethyl aluminum bromide may vary over relatively wide limits such as from 0.05 to about 2.0 moles, and preferably from 0.1 to about 0.5 mole of cocatalyst per mol of Ziegler catalyst.

As indicated above, the copolymerization of the fluoromethyl nuclear-substituted alpha-trifluoromethyl styrenes with the conjugated fluoroolefins may be affected at a temperature from about −80° C. to about 150° C., preferably at a temperature from about −40° C. to to about 100° C. When one of the above-described aqueous systems is used, a temperature from about 0° C. to about 100° C. and preferably from about 15° C. to about 80° C. is employed. When an organic peroxy compound is employed in a mass type polymerization system, the temperature usually is between about −30° C. and about 150° C., the lower temperatures, i.e. below 65° C. being employed when a halogenated peroxide is used, and the higher temperatures when benzoyl peroxide or tertiary-butyl peroxide is used. When a Ziegler type catalyst is employed, the temperature of the copolymerizing system may be as low as −80° C. and is usually between about −40° C. and about 100° C.

The herein-described copolymerization process may be carried out at atmospheric pressure or autogenous pressure or superimposed pressures up to about 1,000 atmospheres. The residence time may vary over relatively wide limits such as 0.5 hour to about 100 hours but the copolymerization is usually allowed to proceed for a period of between about 2 and about 72 hours.

The copolymerization process of the present invention can be carried out in a batchwise or continuous manner as desired. One method of continuous operation involves continuously charging a mixture of the comonomers to a polymerization zone containing the catalyst solution while maintaining a constant pressure in the reaction zone, the pressure in the zone being maintained below the pressure at which one, and preferably both of the monomers, condenses at a specific temperature reaction, and continuously withdrawing the polymer product as it is formed.

It has been found that the addition of various polymerization modifiers appreciably reduces the molecular weight of the polymer product thereby increasing their solubility and ease of fabrication without unduly affecting the over-all yield. Suitable polymerization modifiers include mercaptans such as dodecyl mercaptan, sulfuryl halides such as sulfuryl chloride, and halogenated organic compounds such as chloroform, 1,1,2-trichlorotrifluoroethane (Freon 113), carbon tetrachloride, bromotrichloromethane and trichloroacetyl chloride. Such modifiers are preferably added in amounts between about 0.1 and about 2 parts by weight per 100 parts of total monomers charged to the polymerization reaction zone.

Plasticizers and finely divided solids which serve as fillers can be included in the polymerization mixture and the polymerization can be carried out in their presence. Examples of suitable fillers include pigments such as titanium oxide, metals such as copper and iron powder and other finely divided materials such as mica and asbestos. These and similar materials can also be added to the performed polymers.

The following examples are offered as a better understanding of the present invention and are not to be construed as unnecessarily limiting thereto. The 3-trifluoromethyl-alpha-trifluoromethyl styrene (I) used in the following examples has a boiling point of 87.5° C. at 4 mm. mercury pressure; an index of refraction $(n_D^{24})$ of 1.4148 and a desity $(d_4^{24})$ of 1.4267 and a molar refractivity $(MR_D)$ of 45.30, and is prepared according to the following series of reactions:

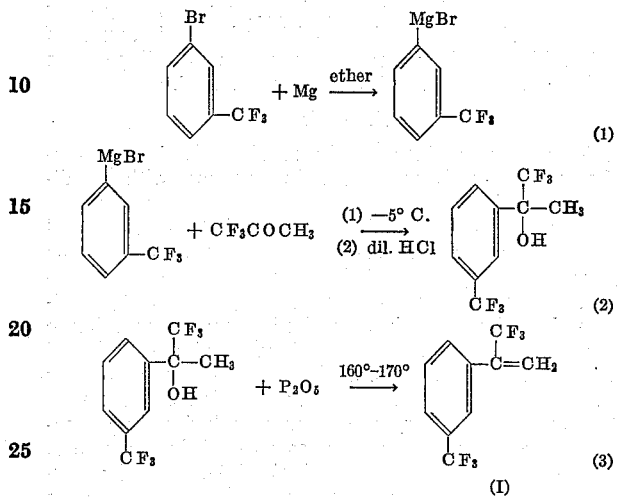

The 3,5-bis-(trifluoromethyl) styrene used in the following examples has the formula,

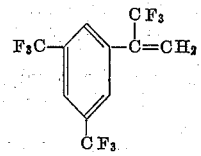

and a boiling point of 157°–168° C.; $n_D^{22}$ of 1.4151; $d_4^{22}$ of 1.346 and $MR_D$ of 44.68. It is prepared according to the above reactions of Equations 1 to 3 except that the starting material employed in Equation 1 is 3,5-bis-(trifluoromethyl)-bromobenzene.

*Example 1*

This example illustrates the copolymerization of 3-trifluoromethyl-alpha-trifluoromethyl styrene and 2-fluorobutadiene.

A heavy walled glass polymerization tube of about 20 ml. capacity was flushed with nitrogen, evacuated at liquid nitrogen temperature and then charged with 1 ml. of a catalyst solution prepared by dissolving 0.4 gram of sodium metabisulfite in 20 ml. of water. The contents of the tube were then flushed and evacuated at liquid nitrogen temperature. Thereafter to the frozen contents of the tube were charged 4 ml. of a solution prepared by dissolving 1 gram of potassium persulfate in 80 ml. of water. The contents of the tube were then refrozen and evacuated at liquid nitrogen temperature. To the frozen contents of the tube were then charged 5 ml. of a solution prepared by dissolving 0.75 gram of perfluorooctanoic acid in 100 ml. of water. A predetermined amount of potassium hydroxide was added to the contents of the tube to adjust the solution to a pH of 7. The tube was next connected to a gas transfer system and evacuated at liquid nitrogen temperature. To the frozen contents of the tube were added 3.85 grams of 3-trifluoromethyl-alpha-trifluoromethyl styrene and 1.15 grams of 2-fluorobutadiene which comprises a 50/50 molar ratio.

After the contents of the tube were thoroughly frozen with liquid nitrogen, the tube was evacuated and sealed. The polymerization tube and the contents were then agitated in a temperature-regulated water bath at 50° C. for a period of 21 hours. At the end of this time, the contents of the tube were coagulated by freezing. The coagulated product was then removed from the tube, washed with hot water, and dried to constant weight in vacuo at 35° C. A rubbery copolymeric product was obtained in an amount corresponding to a 62% conversion. Upon analysis, this product was found to comprise approximately 20 mol percent of the 3-trifluoromethyl-alpha-trifluoromethyl styrene monomer unit, and about 80 mol percent of 2-fluorobutadiene. The raw copolymer can be molded into various articles of manufacture such as resilient gaskets and pump and valve diaphragms using compression molding at about 250° F.

*Example 2*

This example illustrates the copolymerization of 3-trifluoromethyl-alpha-trifluoromethyl styrene with 1,1-difluorobutadiene.

Employing the procedure set-forth in Example 1 and the same aqueous emulsion polymerization system, the tube was charged with 3.64 grams of 3-trifluoromethyl-alpha-trifluoromethyl styrene and 1.36 grams of 1,1-difluorobutadiene which comprised a monomer mixture containing 50 mol percent of each of the indicated monomers. The polymerization reaction was carried out at a temperature of 50° C. for a period of 21 hours. The resultant powdery product was worked up in accordance with the same procedure as set-forth in Example 1. A thermoplastic product was obtained which upon analysis was found to comprise approximately 9 mol percent of the 3-trifluoromethyl-alpha-trifluoromethyl styrene monomer unit and approximately 91 mol percent of the 1,1-difluorobutadiene monomer unit.

*Example 3*

This example illustrates the copolymerization of 3,5-bis(trifluoromethyl) alpha-trifluoromethyl styrene with 1,1-difluorobutadiene.

A heavy walled glass polymerization tube of about 20 ml. capacity was flushed with nitrogen. Thereafter there was charged to this polymerization tube 5 percent by weight of a solution prepared by dissolving 5 grams of potassium stearate in 150 ml. of water adjuusted to a pH of 11 with potassium hydroxide. The contents of the tube were then frozen and thereafter there was added to the tube 5 percent of a solution prepared by dissolving one gram of potassium persulfate in 20 ml. of water. The contents of the tube were then once more frozen and thereafter there was added to the tube 5 percent of a solution prepared by dissolving 0.4 gram of sodium metabisulfite in 30 ml. of water. The entire contents of the tube were once more frozen and the tube was next connected to a gas-transfer system and evacuated at liquid nitrogen temperature. To the frozen contents of the tube were added 1.88 grams of 3,5-bis-(trifluoromethyl)-alpha-trifluoromethyl styrene and 3.12 grams of 1,1-difluorobutadiene which comprised a comonomer mixture containing about 15 mol percent of the indicated styrene and about 85 mol percent of the 1,1-difluorobutadiene. After the contents of the tube were thoroughly frozen with liquid nitrogen, the tube was evacuated and sealed.

The polymerization tube and contents were then agitated in a temperature regulated-water bath at 25° C. for a period of 70 hours. At the end of this time, the contents of the tube were coagulated by freezing. The coagulated product was then removed from the tube, washed with hot water, and then dried to constant weight in vacuo at 35° C. A copolymeric rubbery product was obtained in good yield. This product can be compression molded at a temperature of 275° F. for a period of about 5 minutes to yield a firm and extensible copolymeric sheet.

*Example 4*

This example illustrates the copolymerization of 3,5-bis-(trifluoromethyl)-alpha-trifluoromethyl styrene with 2-fluorobutadiene.

Employing the procedure set forth in Example 3 and the same aqueous emulsion polymerization system, the tube was charged with 2.15 grams of 3,5-bis-(trifluoromethyl)-alpha-trifluoromethyl styrene and 2.85 grams of 2-fluorobutadiene to make up a comonomer mixture containing about 15 mol percent of the indicated styrene and about 85 mol percent of the 2-fluorobutadiene. The polymerization reaction was carried out under autogenous pressure at a temperature of 25° C. for a period of 70 hours. The resultant elastomeric product was worked up in accordance with the same procedure as set-forth in Example 3. A rubbery product was obtained which upon analysis was found to comprise approximately 21 mol percent of the 3,5-bis(trifluoromethyl)-alpha-trifluoromethyl styrene and approximately 79 mol percent of the 2-trifluorobutadiene. The copolymer was obtained in an amount corresponding to a 61 percent conversion.

*Example 5*

This example illustrates the copolymerization of 3,5-bis(trifluoromethyl)-alpha-trifluoromethyl styrene with 1,1,2-trifluorobutadiene.

Employing the procedure set-forth in Example 3 and the same aqueous emulsion polymerization system, the tube was charged with 1.67 grams of 3,5-bis(trifluoromethyl)-alpha-trifluoromethyl styrene and 3.33 grams of 1,1,2-trifluorobutadiene to make up a comonomer mixture containing about 15 mol percent of the indicated styrene and about 85 mol percent of the 1,1,2-trifluorobutadiene. The polymerization reaction was carried out under autogenous pressure at a temperature of 25° C. for a period of 70 hours. The resultant elastomeric product was worked up in accordance with the same procedure as set-forth in Example 3. A rubbery product was obtained which upon analysis was found to comprise approximately 9.5 mol percent of the 3,5-bis(trifluoromethyl)-alpha-trifluoromethyl styrene and approximately 90.5 mol percent of the 1,1,2-trifluorobutadiene. The copolymer was obtained in an amount corresponding to a 62 percent conversion.

*Example 6*

This example illustrates the copolymerization of 3,5-bis(trifluoromethyl)-alpha-trifluoromethyl styrene with 1,1,3-trifluorobutadiene.

Employing the precedure set-forth in Example 3 and the same aqueous emulsion polymerization system, the tube was charged with 1.67 grams of 3,5-bis(trifluoromethyl)-alpha-trifluoromethyl styrene and 3.33 grams of 1,1,3-trifluorobutadiene which comprises a comonomer mixture containing 15 mol percent of the indicated styrene and 85 mol percent of the 1,1,3-trifluorobutadiene. The polymerization reaction was carried out under autogenous pressure at a temperature of 25° C. for a period of 70 hours. The resultant elastomeric product was worked up in accordance with the same procedure as set-forth in Example 1. A rubbery copolymer product was obtained in an amount corresponding to a 17 percent conversion.

*Example 7*

This example further illustrates the copolymerization of 3,5 - bis(trifluoromethyl) - alpha - trifluoromethyl styrene with 1,1,3-trifluorobutadiene.

Employing the procedure set-forth in Example 3 and the same aqueous emulsion polymerization system, the tube was charged with 1.67 grams of 3,5-bis(trifluoromethyl)-alpha-trifluoromethyl styrene and 3.33 grams of 1,1,3-trifluorobutadiene which comprised a monomer mixture containing 15 mol percent of the indicated styrene and 85 mol percent of the 1,1,3-trifluorobutadiene. The polymerization reaction was carried out under autogenous pressure at a temperature of 50° C. for a period of 24 hours. The resultant elastomeric product was worked up in accordance with the same procedure as set-forth in Example 3. A rubbery product was obtained in good yield and, upon analysis, was found to comprise approximately 11 mol percent of 3,5-bis(trifluoromethyl-alpha-trifluoromethyl styrene and 89 mol percent of the 1,1,3-trifluorobutadiene.

*Example 8*

After flushing a 10 ml. glass polymerization tube with nitrogen, 0.1 gram of diethyl aluminum bromide is added thereto. The contents of the tube are then frozen at liquid nitrogen temperature followed by the addition of 0.05 gram of titanium tetrachloride. After refreezing the contents of the tube at liquid nitrogen temperature, a monomeric mixture containing 15 mol percent of 3,5-bis(trifluoromethyl)-alpha-trifluoromethyl styrene (1.67 grams) and 85 mol percent of 1,1,2-trifluorobutadiene (3.33 grams) are condensed into the tube in the absence of air and moisture. The tube is then sealed and the polymerization reaction is allowed to proceed at a temperature of −20° C. for a period of about 24 hours to yield a flexible copolymer of 3,5-bis(trifluoromethyl) - alpha - trifluoromethyl styrene and 1,1,2-trifluorobutadiene in about a 40 percent conversion.

*Example 9*

Employing the procedure set-forth in Example 3 and the same aqueous emulsion polymerization system, the tube was charged with 2.55 grams of 3,5-bis(trifluoromethyl)-alpha-trifluoromethyl styrene and 2.45 grams of butadiene-1,3 which comprised a comonomer mixture containing about 15 mol percent of the indicated styrene and about 85 mol percent of butadiene-1,3. The polymerization reaction was carried out at a temperature of 25° C. for a period of 70 hours. Only a trace yield, i. e. less than 0.1 gram of a solid material was obtained. Essentially no copolymerization of the 3,5-bis(trifluoromethyl)-alpha-trifluoromethyl styrene with the hydrocarbon butadiene occurred.

When employed as protective coatings on any of the surfaces previously described, the raw copolymer is dissolved in a suitable solvent such as ethyl acetate, methyl ethyl ketone, acetone and other similar esters and ketones, and is applied to the desired surfaces employing such apparatus as a knife spreader or a doctor blade or a reverse roll cutter. The solvent after the copolymeric coating composition has been applied to the surface is permitted to evaporate. This also may be accomplished in the presence of cross-linking agents at elevated temperatures, if so desired. In many applications it is desirable to include in the copolymeric coating composition various vulcanizing agents. In the latter case, supplementary heat treatment of the coating is required either during the solvent removal step or thereafter. After the solvent has been completely evaporated, the coated surface is ready for use. In this respect, it should be noted that the polymeric coating composition may be applied to the surface either as a single coating or if so desired, the protective coating may be built up by the application of several layers, each layer being permitted to harden by solvent evaporation before the next layer is applied. Furthermore, if so desired, the protective coatings or the polymeric composition when obtained in the form of sheets may be pigmented.

Other uses for the polymeric compositions of the present invention residue in the fabrication of pump valves, sheet and valve disks, grommets, tubing and pressure sensitive tape for electrical insulation purposes.

Various alterations and modifications of the polymeric compositions of the present invention and of the process employed in their manufacture may become obvious to those skilled in the art without departing from the scope of the present invention.

Having described our invention, we claim:

1. A copolymer comprising 3-trifluoromethyl-alpha-trifluoromethyl styrene and a fluoro-1,3-butadiene in which said styrene comprises at least 2 mol percent of the polymer.

2. A copolymer comprising 3-trifluoromthyl-alpha-trifluoromethyl styrene and 2-fluorobutadiene in which said styrene comprises at least 2 mol percent of the polymer.

3. A copolymer comprising 3-trifluoromethyl-alpha-trifluoromethyl styrene and 1,1-difluorobutadiene in which said styrene comprises at least 2 mol percent of the polymer.

4. A copolymer comprising 3,5-bis-(trifluoromethyl)-alpha-trifluoromethyl styrene and a fluoro-1,3-butadiene in which said styrene comprises at least 2 mol percent of the polymer.

5. A copolymer comprising 3,5-bis(trifluoromethyl)-alpha-trifluoromethyl styrene and 1,1-difluorobutadiene in which said styrene comprises at least 2 mol percent of the polymer.

6. A copolymer comprising 3,5-bis-(trifluoromethyl)-alpha-trifluoromethyl styrene and 1,1,2-trifluorobutadiene in which said styrene comprises at least 2 mol percent of the polymer.

7. A copolymer comprising 3,5-bis-(trifluoromethyl)-alpha-trifluoromethyl styrene and 1,1,2-trifluorobutadiene in which said styrene comprises at least 2 mol percent of the polymer.

8. A process for preparing a polymeric composition which comprises polymerizing a monomeric mixture of an alpha-trifluoromethyl styrene having at least one trifluoromethyl group bonded to the benzene ring and a fluorine-containing butadiene in an aqueous system comprising a peroxy compound at a tempertaure of between about 0° C. and about 100° C. in which said styrene comprises at least 3 mol percent of monomer mixture.

9. A process for preparing a polymeric composition which comprises polymerizing an alpha-trifluoromethyl styrene having at least on trifluoromethyl group bonded to the benzene ring and a fluorine-containing butadiene in the presence of a compound of the group III–A metals containing at least one alkyl group as a catalyst at a temperature of between about −80° C. and about 150° C. in which said styrene comprises at least 3 mol percent of monomer mixture.

10. A process for preparing a polymeric composition which comprises polymerizing a monomeric mixture of an alpha-trifluoromethyl styrene having from one to two trifluoromethyl groups bonded to the benzene ring and a fluoro-1,3-butadiene, said mixture containing between about 3 and about 80 mol percent of the aforesaid styrene and correspondingly between about 97 mol percent and about 20 mol percent of the fluoro-1,3-butadiene in the presence of a polymerization promoter at a temperature between about −80° C. and about 150° C. in which said styrene comprises at least 3 mol percent of monomer mixture.

11. A process for preparing a polymeric composition which comprises polymerizing a monomeric mixture of 3-trifluoromethyl-alpha-trifluoromethyl styrene and 2-fluorobutadiene in the presence of a ploymerization promoter at a temperature between about −40° C. and about 100° C. in which said styrene comprises at least 3 mol percent of monomer mixture.

12. A process for preparing a polymeric composition which comprises polymerizing a monomeric mixture of 3-trifluoromethyl-alpha-trifluoromethyl styrene and 1,1-difluorobutadiene in the presence of a polymerization promoter at a temperature between about −40° C. and about 100° C. in which said styrene comprises at least 3 mol percent of monomer mixture.

13. A process for preparing a polymeric composition which comprises polymerizing a monomeric mixture of 3,5-bis-(trifluoromethyl)-alpha-trifluoromethyl styrene and 1,1-difluorobutadiene at a temperature between about −40° C. and about 100° C. in the presence of a polymerization promoter in which said styrene comprises at least 3 mol percent of monomer mixture.

14. A process for preparing a polymeric composition which comprises polymerizing a monomeric mixture of 3,5-bis-(trifluoromethyl)-alpha-trifluoromethyl styrene and 1,1,2-trifluorobutadiene at a temperature between about −40° C. and about 100° C. in the presence of a polymerization promoter in which said styrene comprises at least 3 mol percent of monomer mixture.

15. A process for preparing a polymeric composition which comprises polymerizing a monomeric mixture of 3,5-bis-(trifluoromethyl)-alpha-trifluoromethyl styrene and 1,1,3-trifluororobutadiene at a temperature between about −40° C. and about 100° C. in the presence of a polymerization promoter in which said styrene comprises at least 3 mol percent of monomer mixture.

16. A polymer comprising an alpha-perfluoroalkyl styrene having at least one perfluoroalkyl group bonded to the benzene ring and a conjugated fluorine-containing polyolefin having from 4 to 10 carbon atoms per molecule, said perfluoroalkyl groups containing from 1 to 5 carbon atoms, in which said styrene comprises at least 2 mol percent of the polymer.

17. A copolymer comprising an alpha-trifluoromethyl styrene having at least one perfluoroalkyl group bonded to the benzene ring and a conjugated fluorine-containing diolefin having from 4 to 10 carbon atoms per molecule, said perfluoroalkyl group bonded to the benzene ring containing from 1 to 5 carbon atoms, in which said styrene comprises at least 2 mol percent of the polymer.

18. A process for preparing a polymeric composition which comprises polymerizing an alpha-perfluoroalkyl styrene having at least one perfluoroalkyl group bonded to the benzene ring and a conjugated fluorine-containing polyolefin having from 4 to 10 carbon atoms per molecule in the presence of a polymerization promoter, said perfluoroalkyl groups containing from 1 to 5 carbon atoms, in which said styrene comprises at least 3 mol percent of monomer mixture.

19. A process for preparing a polymeric composition which comprises polymerizing an alpha-trifluoromethyl styrene having at least one perfluoroalkyl group bonded to the benzene ring and a conjugated fluorine-containing diene having from 4 to 10 carbon atoms per molecule in the presence of a polymerization promoter at a temperature of between about −80° C. and about 150° C., said perfluoroalkyl group bonded to the benzene ring containing from 1 to 5 carbon atoms in which said styrene comprises at least 3 mol percent of monomer mixture.

References Cited in the file of this patent

UNITED STATES PATENTS

| Number | Name | Date |
|---|---|---|
| 2,475,423 | Dickey | July 5, 1949 |
| 2,580,504 | Bachman et al. | Jan. 1, 1952 |
| 2,647,110 | Wiseman | July 28, 1953 |
| 2,691,008 | Grim | Oct. 5, 1954 |
| 2,781,410 | Ziegler | Feb. 12, 1957 |

UNITED STATES PATENT OFFICE
CERTIFICATE OF CORRECTION

Patent No. 2,909,509                                               October 20, 1959

George H. Crawford, Jr., et al

It is hereby certified that error appears in the printed specification of the above numbered patent requiring correction and that the said Letters Patent should read as corrected below.

Column 4, line 36, for "chloroctafluorohexoranoate." read — chlorooctafluorohexanoate. —; column 6, line 37, for "157°-168° C.;" read — 157°-158° C.; —; column 9, line 1, for "3,5-bis(trifluoromethyl-" read — 3,5-bis(trifluoromethyl)- —; column 10, line 22, for "1,1,2-trifluorobutadiene" read — 1,1,3-trifluorobutadiene —; line 35, for "at least on" read — at least one —; column 11, line 10, for "1,1,3-trifluororobutadiene" read — 1,1,3-trifluorobutadiene —.

Signed and sealed this 26th day of April 1960.

(SEAL)
Attest:

KARL H. AXLINE                                                     ROBERT C. WATSON
Attesting Officer                                            Commissioner of Patents